(No Model.) 5 Sheets—Sheet 1.
W. LEWIS & J. T. RAMSDEN.
SPACING MECHANISM.
No. 588,799. Patented Aug. 24, 1897.
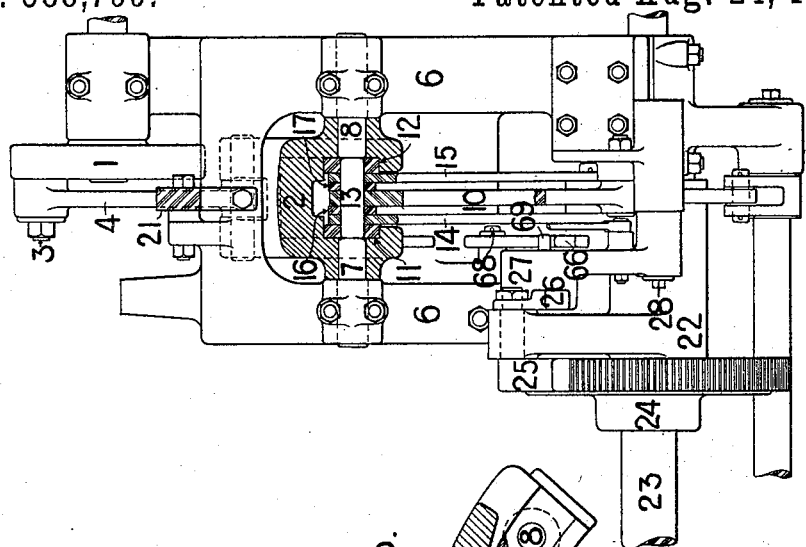
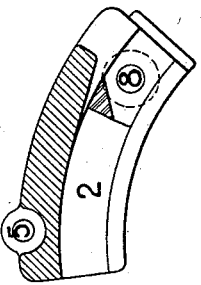
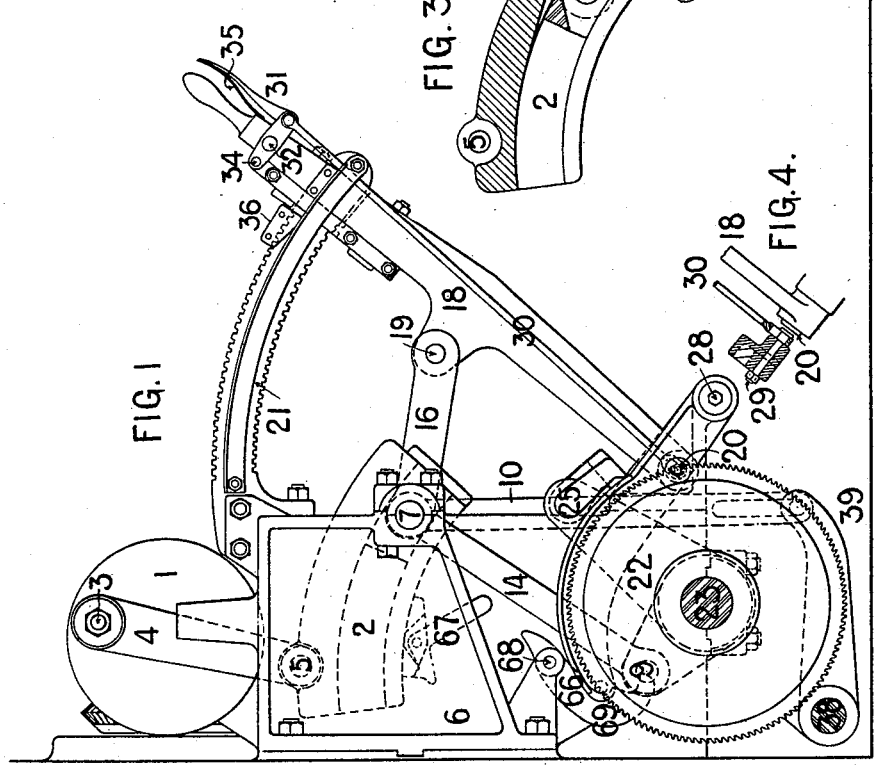
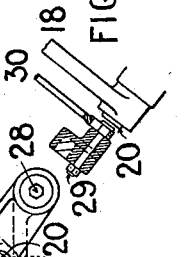
WITNESSES:
Thos. T. Collins
Charles L. Cox.
INVENTORS:
Wilfred Lewis
John T. Ramsden.

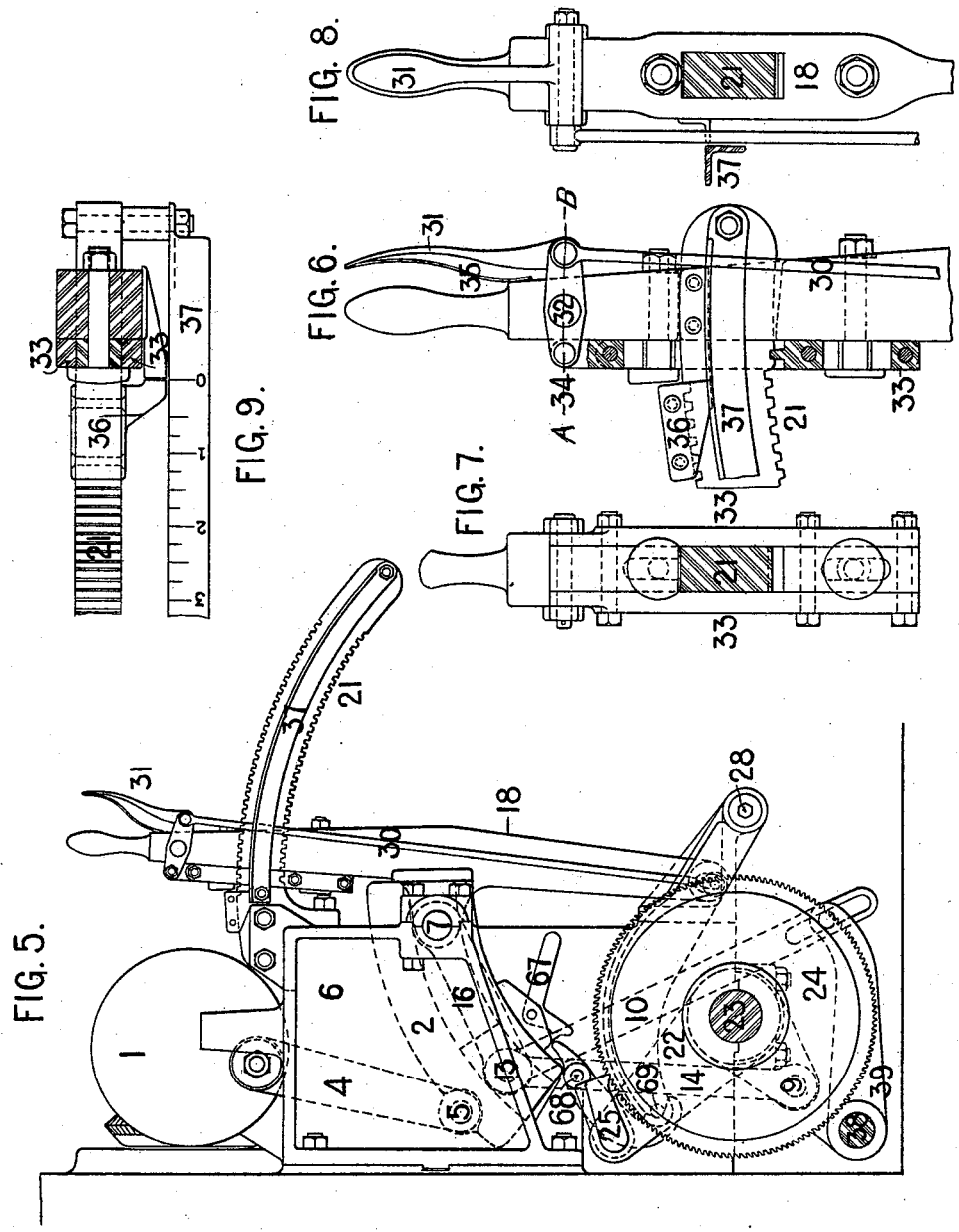

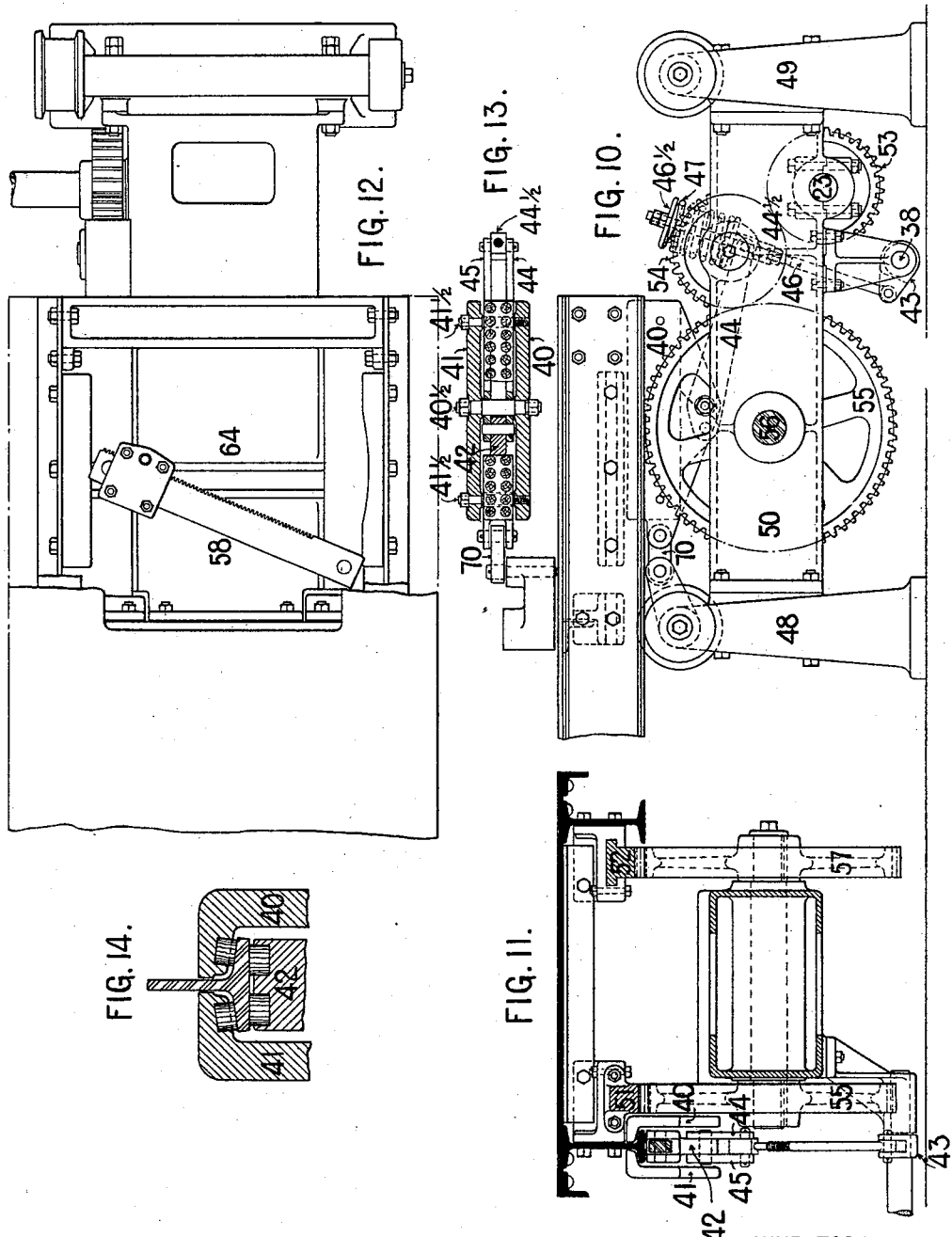

(No Model.) 5 Sheets—Sheet 4.
W. LEWIS & J. T. RAMSDEN.
SPACING MECHANISM.
No. 588,799. Patented Aug. 24, 1897.
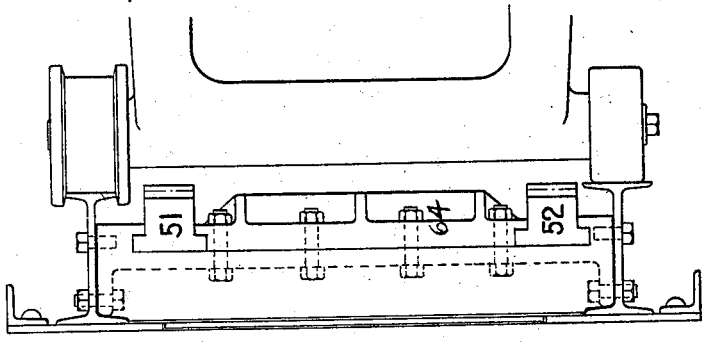
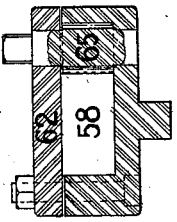
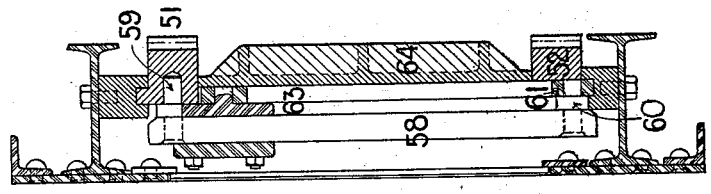
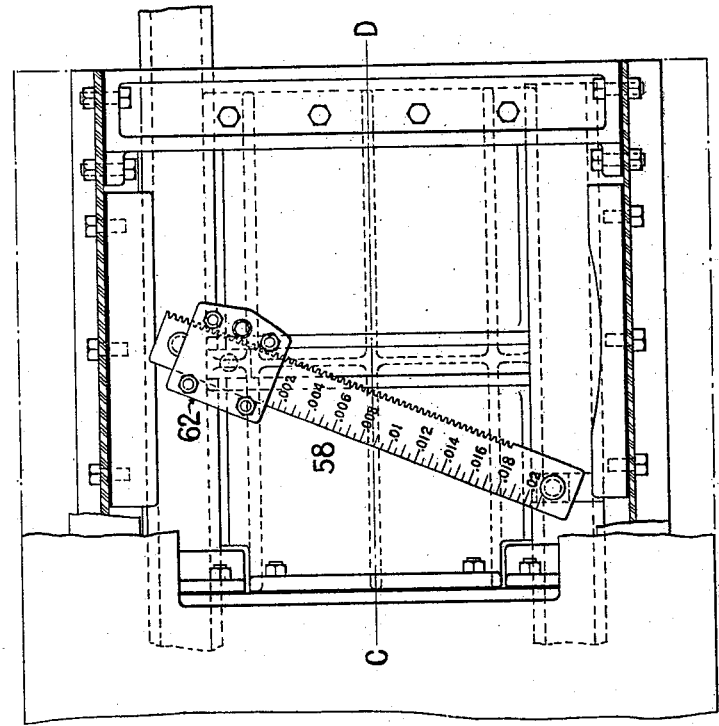
WITNESSES:
Thos. T. Collins
Charles L. Coe.
INVENTORS:
Wilfred Lewis
John T. Ramsden.

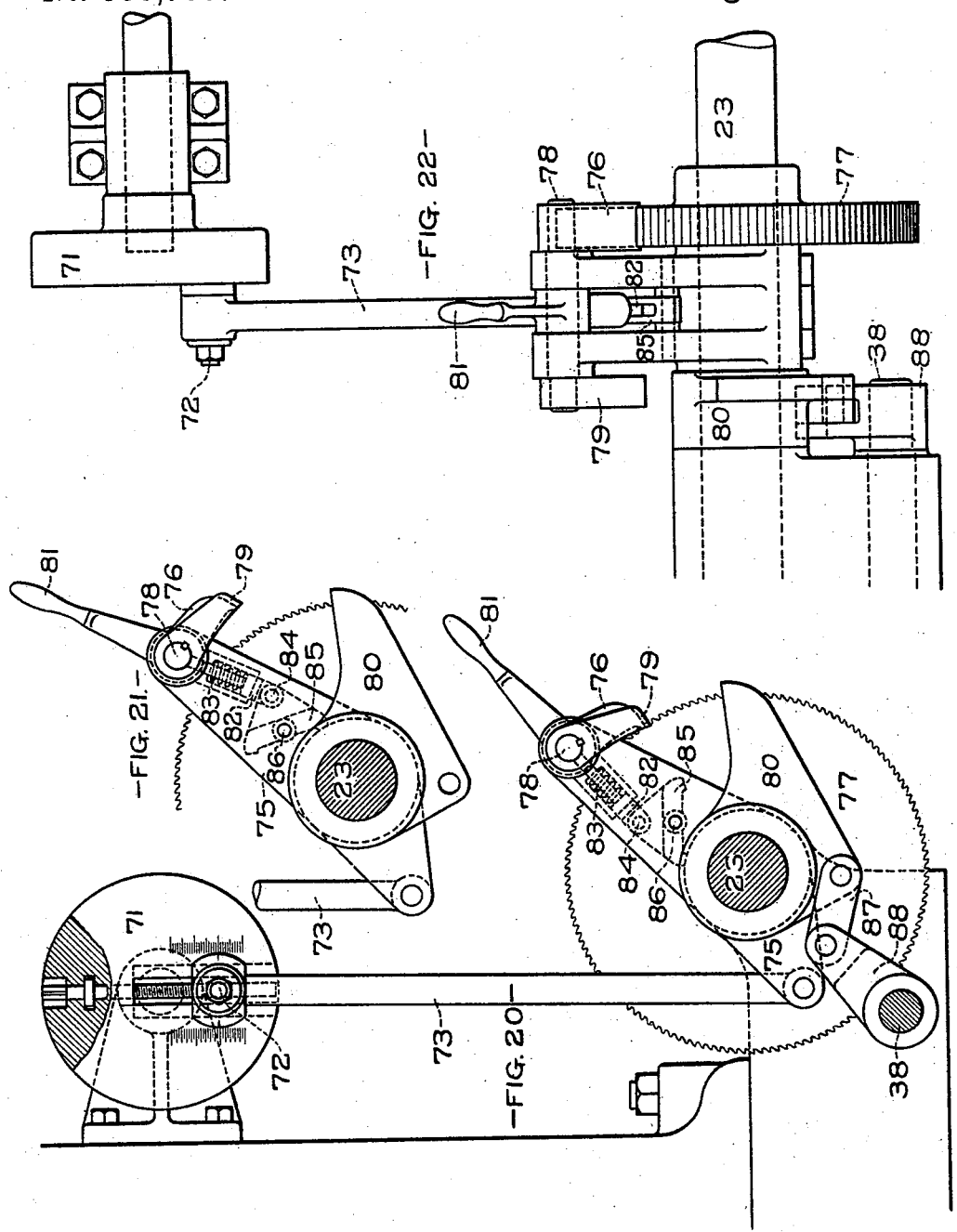

UNITED STATES PATENT OFFICE.

WILFRED LEWIS AND JOHN T. RAMSDEN, OF PHILADELPHIA, PENNSYLVANIA, ASSIGNORS TO THE WILLIAM SELLERS & COMPANY, INCORPORATED, OF SAME PLACE.

SPACING MECHANISM.

SPECIFICATION forming part of Letters Patent No. 588,799, dated August 24, 1897.

Application filed October 15, 1896. Serial No. 609,014. (No model.)

*To all whom it may concern:*

Be it known that we, WILFRED LEWIS and JOHN T. RAMSDEN, of the city and county of Philadelphia, State of Pennsylvania, have invented a new and useful Improvement in Spacing Mechanism, of which the following is a specification.

Our invention may be applied to a variety of purposes, such as marking or stamping at various required intervals of space; but as it is particularly well adapted to punching metal plates, angles, beams, &c., required for structural work, and for the variable spacing in boiler-work, we have illustrated it as applied to a punching-machine.

For the purpose of spacing the holes punched in structural material a spacing-table is usually arranged to move in front of the punching-head, and a ratchet-wheel worked from a slotted disk on the driving-shaft feeds the table when the punch is withdrawn. To change the spacing, the machine must be stopped and the position of the pin in the slotted disk readjusted. This involves a loss of time, which becomes of greater importance the oftener a change is required. On some classes of work the spacing may not be changed for days or weeks, while on other classes it may be changed at almost every stroke. This is particularly true of built-up columns for building purposes, which require close spacing at each end, with longer spaces in between, and hitherto such spacing has been done by hand. In that case a loss has been sustained in labor, which it is the object of our present invention to avoid. In spacing by hand the work to be done is usually more than a man can accomplish between the strokes of a punch, and many strokes are lost in adjusting the plate. There is also more risk of error where close attention to accuracy is disturbed by the necessity for great physical exertion.

To avoid these defects, it is an object of our invention to give the operator of the punch absolute control of the power spacing mechanism to stop, start, and vary the spacing at will while the machine continues in motion.

It is a further object of our invention to effect a change of space without necessarily losing a stroke.

It is a further object of our invention to render the spacing mechanism inoperative unless the amount of space is definitely fixed and determined by a positive act on the part of the operator.

It is a further object of our invention to prevent the engagement of the spacing device except at the end of its stroke.

It is a further object of our invention to attain a high speed of operation and prevent an overrun in spacing from the inertia of the moving parts.

It is a further object of our invention to vary the automatic spacing by an adjustment which adds to or detracts therefrom a fraction of the spacing.

To these ends our invention consists in a vibrating arm which moves a definite distance about a fixed axis, a block sliding in an arc of a circle on said arm, provided with a pivot which is movable with the block to coincide with the fixed axis or to any required distance therefrom, and a link suspended upon said pivot of a length equal to the radius of the arc of the circle on the vibrating arm which the axis of the pivot describes, and attached to a device which operates the spacing apparatus at a point central to the arc of the circle on the vibrating arm when this arm is at one extreme of its vibration.

It further consists of a stop that can be adjusted while the machine is marking or punching, and when so adjusted will limit the movement which determines the length of the next space.

It further consists in a hand attachment the movement of which alters the spacing, and a latch which locks this attachment to place during the spacing and, unlocked, takes the spacing apparatus out of gear.

It further consists in a latch which holds the spacing apparatus out of gear and which is unlatched by the vibrating arm at the end of its stroke.

It further consists in a brake on the spacing-table, so operated as to increase the friction as the length of the table movement is increased, and so as to release all friction when the table movement is starting.

It further consists in two racks driven by the spacing mechanism at slightly-different rates of speed and connected to the spacing-table through a lever with an adjustable fulcrum-pin.

Figure 1, Sheet 1, is an end elevation of the spacing mechanism attached to the side of a punching-machine with the spacing-lever set at zero. Fig. 2 is a side elevation of the mechanism shown in Fig. 1. Fig. 3 is a detail of Fig. 1, showing the swinging arm in section. Fig. 4 is also a detail of Fig. 1, showing the connection between the latch-lever and wiper under ratchet-pawl. Fig. 5, Sheet 2, is an end elevation of the spacing mechanism with the spacing-lever set for a full stroke of the ratchet-pawl. Fig. 6 is an enlarged view of the latched lever, showing the latching-bar in section. Fig. 7 is a side view of Fig. 6, showing the latch on the notched bar, and Fig. 8 is a side view of the same, showing the hand-lever. Fig. 9 is a plan of Fig. 6 at the section A B. Fig. 10, Sheet 3, is a side elevation of the spacing-table and driving machinery. Fig. 11 is an end elevation of Fig. 10, showing the table, racks, and machinery-stand in section. Fig. 12 is a plan of Fig. 10, showing the bar and sliding fulcrum connecting the racks to the table. Fig. 13 is a plan of the table-brake in section, and Fig. 14 is an enlarged vertical section of the brake-shoes in position on the table. Fig. 15, Sheet 4, is an enlarged view of the connection between the racks and the table shown in Fig. 12. Fig. 16 is a longitudinal section on the line C D, Fig. 15. Fig. 17 is a transverse section through the table-slot in Fig. 15. Fig. 18 is an end view of Fig. 15. Fig. 19 is an enlarged view in section of the adjustable fulcrum-piece on the connecting-bar. Fig. 20 is a front elevation of a crank-disk with the crank-pin adjustable radially and showing its connection with the spacing mechanism and the brake-block. Fig. 21 shows the position of the spacing-pawl when it is out of gear with the spacing-wheel, and Fig. 22 is a side elevation of the parts shown in Fig. 20.

1, Figs. 1, 2, and 5, is a crank-disk driven from the eccentric shaft of the punching-machine to make one revolution for each stroke of the punch.

2 is a vibrating arm connected to the crank-pin 3 by the link 4 and pin 5. It is provided with a slot formed in a circular arc to carry the sliding block 11 12, with its pin 13, to which the bell-crank 22 is connected by the double link 14 15 and pin 9.

The radius of the circular arc in 2 is equal to the length of the link 14 15 from center to center, and, as shown in Fig. 1, the pin 9 is at the center of this circular arc. The arm 2 is pivoted in the stand 6 on the pins 7 8 in the arc traversed by the pin 13, and, as shown in Fig. 1, the axes of the pins 13 7 8 are in line. The pin 13 also carries the slotted link 10, which connects with the brake-lever 39, and the double link 16 17, which connects with the hand-lever 18 by the pin 19. The hand-lever 18 is pivoted to the stand 6 by the pin 20 and latched to the bar 21, which is firmly secured to the stand 6. The bell-crank 22, driven by the link 14 15, is mounted loosely on the ratchet-shaft 23, to which the ratchet-wheel 24 is firmly secured. The bell-crank 22 carries the ratchet-pawl 25, to which is attached on the other side of its bearing a wiper 26 over the guard 27, pivoted to the stand 6 at 28 and connected by the pin 29 with the rod 30 from the latch-handle 31. This latch-handle is pivoted at 32 to the hand-lever 18 and again to the latch 33 by the pin 34. The latch 33 is shown in Figs. 6, 7, 8, and 9 as encircling the bar 21 and engaging notches in its lower side. The spring 35 draws upon the latch-handle and snaps the latch into a notch when not withheld by hand.

36 is a rider resting loosely on the bar 21 and engaging in the notches on the upper side of the bar cut to receive it. This rider is intended to be moved by hand to any position indicated on the scale 37, showing the next distance to be spaced. When so placed, the hand-lever 18 can be moved quickly against it and snapped fast by the latch underneath.

66 is a hook pivoted at 68 to the stand 6 and engaging by gravity with the pin 69 in the guard 27 to catch the latter when raised by the latch-handle 31.

67 is a tumbler on the vibrating arm 2 for the purpose of striking a projection on the hook 66 and thereby disengaging the pin 69 at the end of each return stroke of the ratchet. This allows the guard 27 to drop unless otherwise sustained and fixes the end of the return stroke as the only position in which the ratchet can be engaged after being disengaged by the latch-handle 31. By this means nothing less than the full stroke indicated can be taken. The tumbler 67 is pivoted to the vibrating arm 2 merely for the purpose of clearing easily on its return stroke. It might be a rigid stop, and a clearing-toe might be attached to the hook 66, the result accomplished being the same.

38 is a rock-shaft upon which the lever 39 is secured, which is operated by the vibrating arm 2 through the slotted link 10, suspended upon the pivot in the sliding block thereof. This shaft 38 has secured upon it a short lever-arm 43, provided with a pivot, to which the link 46 is attached, which passes through and projects beyond the block 44½, pivoted in the end of the lever-arms 44 45. The projection of the link 46 beyond the block 44½ carries a spiral spring 47, one end of which rests upon the block, while the other is compressed by the washer 46½, which is adjustable upon the link 46 by the lock-nuts upon the end thereof, as shown in Fig. 10. The lever-arms 44 45 are fulcrumed on the pin 40½, secured in the sides of the brake-frame 40 41. These sides are united by this pin and the stud-bolts 41½, so as to form a rigid frame, which is suspended upon the lower flange of one of the I-beams, which forms one side of the table, as shown in Fig. 14. The brake-frame is secured to the stand 48 by the link 70, so as to prevent any longitudinal movement, while it is free to move vertically. The brake-block is pivoted upon the short arm of the lever 44 45, so that when the long arm of this lever is pressed upon by the spiral spring 47 the lower flange of the I-beam in the table will be gripped by the brake. As the compression of the spring can only occur while the vibrating arm 2 is rising, the brake-block will operate only when the movement of the table is slowing down and it will be relieved at all other times. Moreover, as it is operated from the pivot in the sliding block of the vibrating arm the compression of the brake will be proportioned to the movement of the table, so that when the table has its greatest movement and consequently its greatest momentum the grip of the brake upon the table will be at its maximum as the table reaches the end of its stroke, and with shorter movements of the table the grip will be lighter.

48 49 are stands carrying rollers on which the table rests, and 50 is a stand between them in which the gearing for the table-racks 51 and 52 is carried. The spacing-shaft 23 carries the pinion 53, which drives through the idle-wheel 54 into the rack-wheel 55, engaging with the rack 51. This wheel is keyed to the shaft 56, on which the wheel 57, engaging with the rack 52, is also firmly secured. By reason of a slight difference in the diameters of these wheels the engaging-racks 51 and 52 are made to travel at slightly-different rates. At one end of the table, Figs. 12, 15, 16, 17, 18, and 19, these racks are connected by the bar 58, pivoted to the rack 51 by the pin 59, and carrying at the other end the pin 60 in the block 61, fitted to a slot across the rack 52.

62 is a sliding block composed of several parts bolted together around the bar 58. On the under side it carries a pin and block 63, fitted to a cross-slot in the plate 64, bolted to the table. It will be seen from this construction that the position of the block 62 on the bar 58 determines the combined effect of the two racks upon the table movement. The bar 58 is graduated, as shown, to indicate the percentage of increase in spacing as the position of the block 62 is changed, and to facilitate the adjustment of the latter teeth are cut in 58 to receive the pinion 65, by which the adjustment is effected.

Referring again to Figs. 1, 2, 3, 4, 5, 6, 7, 8, and 9, the operation of the mechanism will now be described.

The crank-disk 1, geared with the eccentric shaft operating the punch, drives the vibrating arm 2 through a definite angle about the pivots 7 and 8, and this arm in turn drives the bell-crank 22 through an angle depending upon the position of the pin 13 in the curved slot in the arm 2. As shown in Fig. 1, the pins 7, 8, and 13 coincide and the bell-crank 22 remains at rest, while, as shown in Fig. 5, the pin 13 is at its maximum distance from the fulcrums 7 and 8 and the bell-crank 22 has its maximum throw. When the pins 7, 8, and 13 coincide, the bell-crank 22 will remain at rest, and this is desirable, but not essential. It is only requisite that the smallest movement of the bell-crank shall not be sufficient to enable the pawl 25 to engage with another ratchet in the wheel 24. The change in position of the pin 13 is effected by the lever 18, which may be latched in any desired position on the bar 21, the notches in this bar being so spaced that each additional notch gives one tooth more on the ratchet-wheel 24. As shown in Fig. 1, the vibrating arm 2 is at the top of its throw, and in this position the curved slot in the arm is in an arc concentric with the pin 9 in the link 14 15. Otherwise the bell-crank 22 would be moved by the adjustment of the sliding block, as well as by the connecting-rod 14, which would vitiate the accuracy of every division immediately following an adjustment of the sliding block. By this arrangement the bell-crank 22 comes to the same position at the end of its throw, no matter what the position of the sliding block in the curved slot may be, the length of stroke being varied only by a movement from the position shown in Fig. 1 toward that shown in Fig. 5. The importance of this fact must be realized as a condition necessary to the accurate change of spacing from one pitch to another. In order to have the first spacing right, the table must start from a position corresponding to one of the notches in the ratchet-wheel and not from any intermediate position, and also when a change of spacing occurs the gain or loss must be a definite number of notches, which is accomplished by the uniform limit of travel given to the bell-crank 22 for all spacings.

As shown in Fig. 1, the hand-lever 18 is set at zero, with its latch 33 engaged in a shallow notch, as shown in Fig. 6. The rod 30, connected therewith through the latch-handle 31, is drawn up, raising the guard 27 under the wiper 26 and holding the pawl 25 clear of the teeth in the ratchet-wheel 24. Thus when the hand-lever is at zero the pawl is necessarily out of gear and the table can be moved in either direction by hand or by power, if desired. So, also, when the hand-lever is changed from one position to another the latch-handle 31 must be compressed to draw the latch 33 out of its notch in the bar 21, and this movement raises the pawl 25 clear of the teeth in the ratchet-wheel 24 by raising the guard 27. This guard, when raised, is automatically caught on its pin 69 by the hook 66, pivoted to the stand 6 at 68, and held suspended until the tumbler 67, pivoted to the arm 2, releases it at the end of the return stroke. Then if the hand-lever 18 is latched in any position but zero the guard 27 will drop and allow the pawl 25 to engage the ratchet-wheel 24 at the beginning of its feeding-stroke. By this means it is impossible to engage the pawl 25 with its ratchet-wheel 24 except at the beginning of its stroke, and the danger of shock from sudden engagement while moving rapidly is thus avoided.

To change quickly from one spacing to another, the bar 21 carries a scale 37 and a rider 36, which can be set in advance to the pitch desired, the hand-lever being moved quickly against it at the proper time. For this purpose the bar 21 is shown as notched on its upper and lower edges, though by an equivalent form of latch one set of notches could be made to serve for both rider and latch. By this means a skilful operator can follow a list of irregular spacings without losing a stroke, while at first the spacing can be easily done by unskilled labor with the loss of one stroke only between changes.

The spacing mechanism has now been followed to the ratchet-shaft 23, through which the various angular movements effected may be applied to any useful purpose, and particularly to the movement of a spacing-table, as here shown and described. The spacings of the ratchet-wheel are by fixed differences depending upon the number of teeth used; but in connection with the spacing-table here shown, where two racks are driven at slightly different rates, the spacings can be further varied by small proportions of these fixed differences. This result has been accomplished in other ways, among which may be mentioned a diagonal slot acting upon a cross-slide and wedge, the angle of the slot or wedge or both being changed for any desired effect. These methods are not, however, so conveniently applied to long tables, nor can a table built with diagonal slots and slides be so easily extended.

In all spacing mechanisms care must be taken to avoid lost motion, and in their practical operation a limit of speed is soon reached beyond which the spacing becomes irregular from this cause. To take up lost motion and increase the limit of speed, it has been usual to run the spacing mechanism under a brake, but this is objectionable on account of the increased effort required in starting, causing more wear and tear and adding to the spring in the working parts. As the inertia of the spacing-table must be overcome in starting, it is clear that no unnecessary work should be added to the spacing mechanism at that time, and to prevent lost motion without needless friction it is also clear that the brake-pressure should be proportioned to the spacing used. This we have accomplished by the spring-loaded brake, as shown and described, which acts only during the retarded motion of the table and with a pressure proportioned to the distance spaced. The slotted link 10 from the pin 13, connected with the lever 39, allows the middle of any stroke to be reached before the brake begins to act, after which the lever 39 moves with the link and the brake is held on for another quarter-turn of the crank while punching takes place. Thus the brake is applied and removed automatically at the right times and to the right amount and is always removed when the hand-lever is at zero, permitting the adjustment of the table by hand or by power when desired.

When a change of spacing is not required during the progress of the work, the spacing mechanism may be simplified by dispensing with the vibrating arm and connecting the bell-crank 22 by a link with a crank-pin adjustable radially in the crank-disk 1, whereby the shock of sudden starting or stopping the table will be avoided and any tendency to overrun controlled. Such an arrangement is shown in Figs. 20, 21, and 22. The crank-disk 71 is slotted radially to receive the adjustable crank-pin 72, and the link 73 connects it with the pin 74 in the lever-arm 75. This lever-arm 75 is supported by the shaft 23, on which it vibrates freely and carries on the end opposite the pin 74 a pawl 76, which engages with the ratchet-wheel 77. The pawl 76, Fig. 22, is fastened to the pin 78, which is free to turn in the arm 75, and at the other end of the pin 78 is secured the pawl 79, intended to engage the arm 80 when the ratchet-wheel is in action, as shown in Fig. 20, and to clear the arm 80 when the ratchet-wheel is out of action, as shown in Fig. 21.

Between the pawls 76 and 79 the handle 81 is placed for throwing the spacing mechanism into or out of gear. This handle is extended to receive the plunger 82 and its compression-spring 83. The plunger 82 is attached by the pin 84 to the tumbler 85, pivoted at 86 to the lever-arm 75, the combination forming a spring-snap to hold the pawls into or out of gear. The arm 80 is pivoted on the ratchet-shaft 23 and connected by the link 87 with the arm 88 on the brake-shaft 38. When the crank-pin reaches the middle of its throw, the pawl 79, Fig. 20, comes in contact with lever 80 and begins to apply the table-brake through the link 87, arm 88, and brake-shaft 38. When the pawl 79 is thrown out, as shown in Fig. 21, it passes clear of the arm 80, and the table may then be moved by hand or by power in either direction.

Having now described our invention and illustrated the same by the drawings referred to in the description, what we claim as new, and desire to secure by Letters Patent, is—

1. In a spacing mechanism, a vibrating arm which moves a definite distance about a fixed axis, a block sliding in an arc of a circle on said arm, and a pivot secured to said block and movable therewith to coincide with the fixed axis, or to any required distance therefrom, in combination with a link, of a length equal to the radius of the arc of the circle on the vibrating arm which the axis of the pivot describes, one end of which link is attached to the pivot, while the other end is attached to a device, which operates the spacing apparatus, at a point central to the arc of the circle on the vibrating arm when this arm is at one extreme of its vibration.

2. In a spacing mechanism, a vibrating arm which moves a definite distance about a fixed axis, a block sliding in an arc of a circle on said arm, and a pivot secured to said block and movable therewith to coincide with the fixed axis, or to any required distance therefrom, in combination with a block sliding upon a fixed bar over a series of notches in said bar, to which the block may be locked at any of the said notches, a hand attachment movable after the said block over said bar and its notches, and mechanism which connects the hand attachment with the pivot which is movable to and from the fixed axis on the vibrating arm.

3. In a spacing mechanism, a hand attachment sliding over a series of notches in a fixed bar, a latch which locks this attachment at any of the notches in said bar and a spacing apparatus, in combination with mechanism attached to said latch which takes the spacing apparatus out of gear, when the latch unlocks the hand attachment.

4. In a spacing mechanism, a hand attachment sliding over a series of notches in a fixed bar, a latch which locks this attachment at any of the notches in said bar, a spacing apparatus and mechanism attached to said latch which takes the spacing apparatus out of gear, when the latch unlocks the hand attachment, in combination with a latch which holds the spacing apparatus out of gear.

5. In a spacing mechanism, a latch which holds the spacing apparatus out of gear, in combination with a tripping device on the vibrating arm which releases the said latch as the vibrating arm reaches one extremity of its movement.

6. In a spacing mechanism a crank-pin which intermittently operates a spacing-table and a brake-block which intermittently operates to retard the spacing-table, in combination with mechanism which connects the crank-pin with the brake-block and proportions the brake action to the spacing movement.

7. In a spacing mechanism, a spacing-table with two racks, the said racks having different rates of progression, and a lever each end of which is pivoted to move with one of the racks, in combination with a fulcrum-pivot adjustable along said lever and in the table between the racks.

WILFRED LEWIS.
JOHN T. RAMSDEN.

Witnesses:
JOHN L. PHILLIPS,
E. R. HARPER.